(12) United States Patent
Cota-Robles et al.

(10) Patent No.: US 8,543,772 B2
(45) Date of Patent: *Sep. 24, 2013

(54) INVALIDATING TRANSLATION LOOKASIDE BUFFER ENTRIES IN A VIRTUAL MACHINE (VM) SYSTEM

(75) Inventors: Eric C. Cota-Robles, Portland, OR (US); Andy Glew, Hillsboro, OR (US); Stalinselvaraj Jeyasingh, Beaverton, OR (US); Alain Kagi, Portland, OR (US); Michael A. Kozuch, Export, PA (US); Gilbert Neiger, Portland, OR (US); Richard Uhlig, Hillsboro, OR (US)

(73) Assignee: Intel Corporation, Santa Clara ( * ) Notice: Subject to any disclaimer, the term of this patent is extended or adjusted under 35 U.S.C. 154(b) by 299 days.

This patent is subject to a terminal disclaimer.

(21) Appl. No.: 12/959,109

(22) Filed: Dec. 2, 2010

(65) Prior Publication Data
US 2012/0117300 A1    May 10, 2012

Related U.S. Application Data

(63) Continuation of application No. 10/973,678, filed on Oct. 25, 2004, now Pat. No. 7,865,670, which is a continuation of application No. 10/676,584, filed on Sep. 30, 2003, now abandoned.

(51) Int. Cl.
*G06F 12/08*    (2006.01)
(52) U.S. Cl.
USPC ......... 711/145; 711/6; 711/133; 711/E12.016
(58) Field of Classification Search
USPC .............................. 711/133, 145, 6, E12.016
See application file for complete search history.

(56) References Cited

U.S. PATENT DOCUMENTS 3,014,745 A    12/1961    Kytta
3,996,449 A    12/1976    Attanasio et al.
(Continued)

FOREIGN PATENT DOCUMENTS

DE    0473913 A2    3/1992
DE    4217444 A1    12/1992
(Continued)

OTHER PUBLICATIONS

Intel Corporation, "IA-64 System Abstraction Layer Specification", Intel Product Specification, Order No. 245359-001, 112 pages, Jan. 2000.

(Continued)

*Primary Examiner* — Yong Choe
(74) *Attorney, Agent, or Firm* — Thomas R. Lane

(57) ABSTRACT

One embodiment of the present invention is a technique to invalidate entries in a translation lookaside buffer (TLB). A TLB in a processor has a plurality of TLB entries. Each TLB entry is associated with a virtual machine extension (VMX) tag word indicating if the associated TLB entry is invalidated according to a processor mode when an invalidation operation is performed. The processor mode is one of execution in a virtual machine (VM) and execution not in a virtual machine. The invalidation operation belongs to a non-empty set of invalidation operations composed of a union of (1) a possibly empty set of operations that invalidate a variable number of TLB entries, (2) a possibly empty set of operations that invalidate exactly one TLB entry, (3) a possibly empty set of operations that invalidate the plurality of TLB entries, (4) a possibly empty set of operations that enable and disable use of virtual memory, and (5) a possibly empty set of operations that configure physical address size, page size or other virtual memory system behavior in a manner that changes the manner in which a physical machine interprets the TLB entries.

26 Claims, 4 Drawing Sheets

(56) References Cited

U.S. PATENT DOCUMENTS

| | | |
|---|---|---|
| 4,037,214 A | 7/1977 | Birney et al. |
| 4,162,536 A | 7/1979 | Morley |
| 4,247,905 A | 1/1981 | Yoshida et al. |
| 4,276,594 A | 6/1981 | Morley |
| 4,278,837 A | 7/1981 | Best |
| 4,307,447 A | 12/1981 | Provanzano et al. |
| 4,319,323 A | 3/1982 | Ermolovich et al. |
| 4,366,537 A | 12/1982 | Heller et al. |
| 4,430,709 A | 2/1984 | Schleupen |
| 4,521,852 A | 6/1985 | Guttag |
| 4,571,672 A | 2/1986 | Hatada et al. |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,907,270 A | 3/1990 | Hazard |
| 4,907,272 A | 3/1990 | Hazard et al. |
| 4,910,774 A | 3/1990 | Barakat |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth |
| 5,139,760 A | 8/1992 | Ogawa et al. |
| 5,187,802 A | 2/1993 | Inoue et al. |
| 5,230,069 A | 7/1993 | Brelsford et al. |
| 5,239,424 A | 8/1993 | Hasegawa et al. |
| 5,255,379 A | 10/1993 | Melo |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,528,231 A | 6/1996 | Patarin |
| 5,533,126 A | 7/1996 | Hazard |
| 5,555,385 A | 9/1996 | Osisek |
| 5,555,414 A | 9/1996 | Hough et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,720,609 A | 2/1998 | Pfefferle |
| 5,721,222 A | 2/1998 | Bernstein et al. |
| 5,729,760 A | 3/1998 | Poisner |
| 5,737,604 A | 4/1998 | Miller et al. |
| 5,737,760 A | 4/1998 | Grimmer, Jr. et al. |
| 5,747,903 A | 5/1998 | Klingler |
| 5,757,919 A | 5/1998 | Herbert et al. |
| 5,767,969 A | 6/1998 | Chevalier |
| 5,796,835 A | 8/1998 | Saada |
| 5,796,845 A | 8/1998 | Serikawa et al. |
| 5,805,712 A | 9/1998 | Davis |
| 5,825,875 A | 10/1998 | Ugon |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal et al. |
| 5,901,225 A | 5/1999 | Ireton et al. |
| 5,903,752 A | 5/1999 | Dingwall et al. |
| 5,935,247 A | 8/1999 | Pai et al. |
| 5,937,063 A | 8/1999 | Davis |
| 5,953,502 A | 9/1999 | Helbig, Sr. |
| 5,956,408 A | 9/1999 | Arnold |
| 5,970,147 A | 10/1999 | Davis |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,044,478 A | 3/2000 | Green |
| 6,055,637 A | 4/2000 | Hudson et al. |
| 6,055,639 A | 4/2000 | Schanze |
| 6,058,478 A | 5/2000 | Davis |
| 6,061,794 A | 5/2000 | Angelo et al. |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,115,816 A | 9/2000 | Davis |
| 6,125,430 A | 9/2000 | Noel et al. |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,205,550 B1 | 3/2001 | Nardone et al. |
| 6,212,635 B1 | 4/2001 | Reardon |
| 6,222,923 B1 | 4/2001 | Schwenk |
| 6,249,872 B1 | 6/2001 | Wildgrube et al. |
| 6,252,650 B1 | 6/2001 | Nakamura |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,308,270 B1 | 10/2001 | Guthery |
| 6,314,409 B2 | 11/2001 | Schneck et al. |
| 6,321,314 B1 | 11/2001 | Van Dyke |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams et al. |
| 6,374,286 B1 | 4/2002 | Gee et al. |
| 6,374,317 B1 | 4/2002 | Ajanovic et al. |
| 6,378,068 B1 | 4/2002 | Foster et al. |
| 6,378,072 B1 | 4/2002 | Collins et al. |
| 6,389,537 B1 | 5/2002 | Davis et al. |
| 6,397,242 B1 | 5/2002 | Devine et al. |
| 6,412,035 B1 | 6/2002 | Webber |
| 6,421,702 B1 | 7/2002 | Gulick |
| 6,435,416 B1 | 8/2002 | Slassi |
| 6,445,797 B1 | 9/2002 | McGough |
| 6,463,535 B1 | 10/2002 | Drews |
| 6,463,537 B1 | 10/2002 | Tello |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,535,988 B1 | 3/2003 | Poisner |
| 6,557,104 B2 | 4/2003 | Vu et al. |

| | | | |
|---|---|---|---|
| 6,633,963 | B1 | 10/2003 | Ellison et al. |
| 6,633,981 | B1 | 10/2003 | Davis |
| 6,674,536 | B2 * | 1/2004 | Long et al. .................. 358/1.15 |
| 6,839,813 | B2 * | 1/2005 | Chauvel ...................... 711/145 |
| 7,347,565 | B2 | 3/2008 | Shimakura |
| 2001/0021969 | A1 | 9/2001 | Burger et al. |
| 2001/0027527 | A1 | 10/2001 | Khidekel et al. |
| 2001/0037450 | A1 | 11/2001 | Metlitski et al. |
| 2002/0169717 | A1 | 11/2002 | Challener |
| 2003/0018892 | A1 | 1/2003 | Tello |

FOREIGN PATENT DOCUMENTS

| | | |
|---|---|---|
| DE | 0600112 A1 | 6/1994 |
| EP | 0930567 A1 | 7/1999 |
| EP | 0952902 A1 | 11/1999 |
| EP | 0961193 A2 | 12/1999 |
| EP | 1030237 A1 | 8/2000 |
| EP | 1085396 A1 | 3/2001 |
| EP | 1146715 A1 | 10/2001 |
| EP | 1271277 A2 | 1/2003 |
| EP | 1271277 A3 | 5/2003 |
| JP | 2000076139 A1 | 3/2000 |
| WO | 95/24696 A2 | 9/1995 |
| WO | 95/24696 A3 | 2/1996 |
| WO | 97/29567 A1 | 8/1997 |
| WO | 98/34365 A1 | 8/1998 |
| WO | 98/44402 A1 | 10/1998 |
| WO | 99/05600 A2 | 2/1999 |
| WO | 99/09482 A1 | 2/1999 |
| WO | 99/18511 A1 | 4/1999 |
| WO | 99/05600 A3 | 5/1999 |
| WO | 99/57863 A1 | 11/1999 |
| WO | 99/65579 A1 | 12/1999 |
| WO | 00/21238 A1 | 4/2000 |
| WO | 00/62232 A1 | 10/2000 |
| WO | 01/27723 A1 | 4/2001 |
| WO | 01/27821 A2 | 4/2001 |
| WO | 01/63994 A2 | 8/2001 |
| WO | 01/75564 A2 | 10/2001 |
| WO | 01/75565 A2 | 10/2001 |
| WO | 01/75595 A2 | 10/2001 |
| WO | 02/17555 A2 | 2/2002 |
| WO | 01/63994 A3 | 4/2002 |
| WO | 01/27821 A3 | 5/2002 |
| WO | 01/75565 A3 | 6/2002 |
| WO | 01/75595 A3 | 7/2002 |
| WO | 02/086684 A2 | 10/2002 |
| WO | 01/75564 A3 | 1/2003 |
| WO | 02/017555 A3 | 1/2003 |
| WO | 02/086684 A3 | 10/2003 |

OTHER PUBLICATIONS

Intel Corporation, "IntelIA-64 Architecture Software Developer's Manual- vol. 2: IA-64 System Architecture", Intel Product Manual, Order No. 245318-001, pp. i, ii, 5.1-5.3, 11.1-11.8, 11.23-11.26, Jan. 2000.
Berg, Cliff, "How Do I Create a Signed Applet?", Dr. Dobb's Journal, (Aug. 1997), pp. 1-9.
Brands, Stefan, "Restrictive Blinding of Secret-Key Certificates", Springer-Verlag XP002201306, (1995), ChaDter 3.
Chien, Andrew A., et al., "Safe and Protected Execution for the Morph/AMRM Reconfigurable Processor", 7th Annual IEEE Symposium, FCCM '99 Proceedings, XP010359180, ISBN 0-7695-0375-6, Los Alamitos, CA, (Apr. 21, 1999), pp. 209-221.
Compaq Computer Corporation, et al., "Trusted Computing Platform Alliance (TCPA) Main Specification Version 1.1a", (Dec. 2001), pp. 1-321.

Davida, George I., et al., "Defending Systems Against Viruses through Cryptographic Authentication", Proceedings of the Symposium on Security and Privacy, IEEE Compo Soc. Press, ISBN 0-8186-1939-2, (May 1989).
Goldberg, Robert P., "Survey of Virtual Machine Research", Computer Magazine, (Jun. 1974), pp. 34-35.
Gong, Li , et al., "Going Behond the Sandbox: An Overview of the New Security Architecture in the Java Development Kit 1.2", Proceedings of the USENIX Symposium on Internet Technologies and Systems, Monterey, CA, (Dec. 1997).
Gum, P. H., "System/370 Extended Architecture: Facilities for Virtual Machines", IBM J. Research Development, vol. 27, No. 6, (Nov. 1983), pp. 530-544.
Heinrich, Joe, "MIPS R4000 Microprocessor User's Manual, Second Edition", Chapter 4 "Memory Management", (Jun. 11, 1993), pp. 61-97.
IBM, "Information Display Technique for a Terminate Stay Resident Program IBM Technical Disclosure Bulletin", TDB-ACC-No. NA9112156, vol. 34, Issue 7A, (Dec. 1, 1991), pp. 156-158.
Intel Corporation, "IA-32 Intel Architecture Software Developer's Manual—vol. 3: System Proqrarnming Guide", (2003) pp. 13-1 to 13-24.
Intel Corporation, "Intel386 OX Microprocessor 32-Bit CHMOS Microprocessor With Integrated Memory Management", (1995), pp. 5-56.
Karger, Paul A., et al., "A VMM Security Kernel for the VAX Architecture", Proceedings of the Symposium on Research in Security and Privacy, XP010020182, ISBN 0-8186-2060-9, Boxborough, MA, (May 7, 1990), pp. 2-19.
Kashiwagi, Kazuhiko, et al., "Design and Implementation of Dynamically Reconstructing System Software", Software Engineering Conference, Proceedings 1996 Asia-Pacific Seoul, South Korea Dec. 4-7, 1996, Los Alamitos,CA USA, IEEE Comput. Soc, US, ISBN 0-8186-7638-8, (1996).
Lawton, Kevin, et al., "Running Multiple Operating Systems Concurrently on an IA32 PC Using Virtualization Techniques", http://www.plex86.orQlresearch/paper.txt, (Nov. 29, 1999), pp. 1-31.
Luke, Jahn , et al., "Replacement Strategy for Aging Avionics Computers", IEEE AES Systems Magazine, XP002190614, (Mar. 1999).
Menezes, Oorschot, "Handbook of Applied Cryptography", CRC Press LLC, USA XP002201307, (1997), p, 475.
Richt, Stefan, et al., "In-Circuit-Emulator Wird Echtzeittauglich", Elektronic, Franzis Verlag GMBH, Munchen, DE, vol. 40, No. 16, XP000259620, (Aug. 6, 1991), pp. 100-103.
Robin, John S., et al., "Analysis of the Pentium's Ability to Support a Secure Virtual Machine Monitor", Proceedings of the 9th USENIX Security Symposium, XP002247347, Denver, Colorado, (Aug. 14, 2000), pp. 1-17.
Rosenblum, M., "Virtual Platform: A Virtual Machine Monitor for Commodity PC", Proceedinas of the 11th Hotchips Conference, (Aug. 17, 1999), pp. 185-196.
Saez, Sergio, et al., "A Hardware Scheduler for Complex Real-Time Systems", Proceedings of the IEEE International Symposium on Industrial Electronics, XP002190615,(Jul. 1999), pp. 43-48.
Sherwood, Timothy, et al., "Patchable Instruction ROM Architecture", Department of Computer Science and Engineering, University of California, San Diego, La Jolla, CA, (Nov. 2001).
Motorola, "M68040 User's Manual", (1993), pp. 1-1 to 8-32.
IBM, "Interpretive Execution", IBM System Extended Architecture, Publication #SA22-7095-1, File No. S370-01, Sep. 1985.

* cited by examiner

INVALIDATING TRANSLATION LOOKASIDE BUFFER ENTRIES IN A VIRTUAL MACHINE (VM) SYSTEM

CROSS REFERENCE TO RELATED APPLICATIONS

This application is a Continuation of U.S. patent application Ser. No. 10/973,678, entitled "Invalidating Translation Lookaside Buffer Entries in a Virtual Machine System," by Erik C. Cota-Robles, et al., filed on Oct. 25, 2004, which is a Continuation of U.S. patent application Ser. No. 10/676,584, entitled "Invalidating Translation Lookaside Buffer Entries in a Virtual Machine System," by Erik C. Cota-Robles, et al., filed on Sep. 30, 2003, and is related to U.S. patent application Ser. No. 12/130,125, entitled "Invalidating Translation Lookaside Buffer Entries in a Virtual Machine System," by Erik C. Cota-robles, et al., filed on May 30, 2008. The above referenced applications are incorporated by reference herein in their entirety.

BACKGROUND

1. Field of the Invention

This invention relates to virtual machines. In particular, the invention relates to translation lookaside buffers that support a virtual-machine system.

2. Description of Related Art

A virtual-machine system is a computer system that includes a virtual machine monitor (VMM) supporting one or more virtual machines (VMs). A Virtual Machine Monitor (VMM) is a software program that controls physical computer hardware and presents programs executing within a Virtual Machine (VM) with the illusion that they are executing on real physical computer hardware. Each VM typically functions as a self-contained platform, controlled by a "guest" operating system (OS), i.e., an OS hosted by the VMM, which executes as if it were running on a real machine instead of within a VM.

To accomplish this simulation, it is necessary for some operations within a VM (e.g., attempts to configure device hardware) to be trapped and emulated by the VMM, which will perform operations to simulate virtual hardware resources (e.g., a simulated device) to maintain the illusion that the guest OS is manipulating real hardware. Thus, in a virtual-machine system transitions from a VM to the VMM and back will occur with some frequency, depending upon the number of instructions and events that the VMM must emulate.

In a virtual-memory system, a memory address generated by software (a "virtual" address) is translated by hardware into a physical address which is then used to reference memory. This translation process is called paging, and the hardware used to perform the translation is called the paging hardware. In many virtual-memory systems, the virtual-to-physical address translation is defined by system software in a set of data structures (called page tables) that reside in memory. Modern virtual-memory systems typically incorporate into a system's central processing unit (CPU) a specialized caching structure, often called a translation lookaside buffer (TLB), which stores information about virtual-to-physical address translations and which can be accessed far more quickly than memory.

When an OS stops executing one process and begins executing another, it will typically change the address space by directing the hardware to use a new set of paging structures. This can be accomplished using a software or hardware mechanism to invalidate or remove the entire contents of the TLB. More frequent than changes between processes are transitions of control between a process and OS software. Because of this, system performance would suffer significantly if the TLB were invalidated on each such transition. Thus, modern operating systems are typically constructed so that no change of address space is required. One or more ranges of (virtual) memory addresses in every address space are protected so that only the OS can access addresses in those ranges.

In a virtual-machine system, certain operations within a VM must be trapped and emulated by the VMM. While this is much as an OS supports a user process, the situation here is different. Applications designed to run in user processes are bound by the address-space constraints imposed by the OS. In contrast, software that executes in a VM is not aware that it is being supported by a VMM and thus expects to have access to all memory addresses. For this reason, a VM and its supporting VMM cannot easily share an address space.

If a VM and its support VMM do not share an address space, then transitions between the VM and the VMM will adversely affect performance because all entries in the TLB must be invalidated on each such transition. Therefore, there is a need to have an efficient technique to allow translations for different address spaces to coexist in the TLB in a VM system.

BRIEF SUMMARY

One embodiment of the present invention is a technique to invalidate entries in a translation lookaside buffer (TLB). A translation lookaside buffer (TLB) in a processor has a plurality of TLB entries. Each TLB entry is associated with a virtual machine extension (VMX) tag word indicating if the associated TLB entry is invalidated according to a processor mode when an invalidation operation is performed. The processor mode is one of execution in a virtual machine (VM) and execution not in a virtual machine. The invalidation operation belongs to a non-empty set of invalidation operations composed of a union of (1) a possibly empty set of operations that invalidate a variable number of TLB entries, (2) a possibly empty set of operations that invalidate exactly one TLB entry, (3) a possibly empty set of operations that invalidate the plurality of TLB entries, (4) a possibly empty set of operations that enable and disable use of virtual memory, and (5) a possibly empty set of operations that configure physical address size, page size or other virtual memory system behavior in a manner that changes the manner in which a physical machine interprets the TLB entries.

BRIEF DESCRIPTION OF THE DRAWINGS

The features and advantages of the present invention will become apparent from the following detailed description of the present invention in which.

DESCRIPTION

In the following description, numerous specific details are set forth. However, it is understood that embodiments of the invention may be practiced without these specific details. In other instances, well-known circuits, structures, and techniques have not been shown in order not to obscure the understanding of this description.

Existing physical machines that support VM operation control the execution environment of a VM using a structure herein referred to as a Virtual Machine Control Structure (VMCS). The VMCS is stored in a region of memory and contains, for example, state of the guest, state of the VMM, and control information indicating under which conditions the VMM wishes to regain control during guest execution. The one or more processors in the physical machine read information from the VMCS to determine the execution environment of the VM and VMM, and to constrain the behavior of the guest software appropriately.

In systems using paging, the translation process will require one or more memory references because the paging hardware may need to fetch from memory data from one or more page tables. The virtual-to-physical address translation defined by a set of page tables is called an address space. Typically, operating systems execute each application program, or process, in a separate address space. In some virtual-memory systems, the TLB is largely under the control of the paging hardware. One embodiment of the present invention relates to systems in which the paging hardware determines when to cache in the TLB a virtual-to-physical address translation that has been fetched from the page tables in memory.

The paging structures that define the address translation reside in memory and may be modified by system software. This may cause translation information cached in the TLB to become out of date. In addition, systems allow software to direct the hardware to use an entirely different set of paging structures so that the entire contents of the TLB may become out of date. The hardware of some virtual-memory systems may detect such changes and then remove or modify out-of-date translation information while other systems provide software with special instructions to remove such information and still other systems use a combination of the two techniques.

Figure 1:
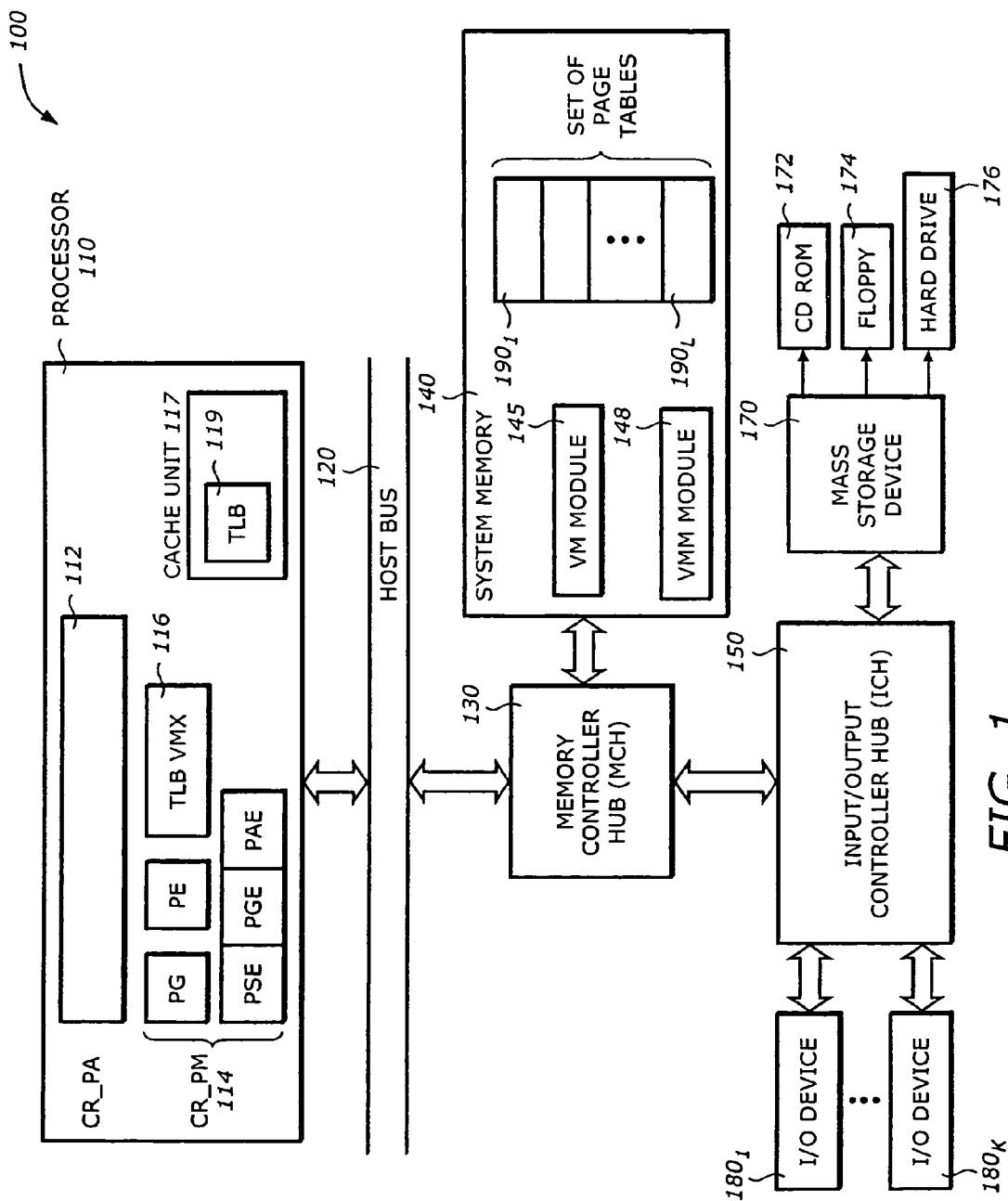
FIG. 1 is a diagram illustrating a system in which one embodiment of the invention can be practiced.

FIG. 1 is a diagram illustrating a computer system 100 in which one embodiment of the invention can be practiced. The computer system 100 includes a processor 110, a host bus 120, a memory control hub (MCH) 130, a system memory 140, an input/output control hub (ICH) 150, a mass storage device 170, and input/output devices $180_1$ to $180_K$.

The processor 110 represents a central processing unit of any type of architecture, such as embedded processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In one embodiment, the processor 110 is compatible with the Intel Architecture (IA) processor, sometimes referred to as IA-32. The processor 110 typically contains a number of control registers to support memory management tasks such as virtual memory and cache memory. These tasks may include paging and segmentation. The processor 110 also has a cache unit 117. The cache unit 117 has a translation lookaside buffer (TLB) 119. In one embodiment, the processor 110 is compatible with the Intel Architecture (IA) processor, has control registers and a TLB and further supports a Virtual Machine eXtension (VMX) mode. The VMX mode is a mode whereby all virtualization holes in the processor's instruction set are trapped. Software in this new mode executes with as many protection rings (e.g., 4) and with the same paging protection as it would ordinarily have, but whenever privileged software in a VM attempts to change machine state that is virtualized (e.g., mask interrupts) a variety of hardware and software techniques are used by hardware (e.g., the processor), software (e.g., the VMM) or both to provide software in the VM with the illusion that it has effected the change to the actual hardware state when in fact only the model presented to the VM has changed state.

The control registers include a first control register CR_PA 112 and a second control register CR_PM 114. The CR_PA register contains the (physical) address of the currently active page table while the CR_PM register contains various "paging_mode" fields such as a "page mode" bit to enable paging. In one embodiment of the invention these control registers are mapped onto the control registers with the same functionality in the Intel Instruction Set Architecture as follows: CR_PA 112 is CR3, and some fields of CR_PM are located in CR0 and others in CR4. Specifically, the CR0 register has two control bits from CR_PM: protected mode enable (PE) and page mode (PG), and the CR4 register has three control bits from CR_PM: Page Size Extension (PSE), Page Global Enable (PGE), and Physical Address Extension (PAE).

In another embodiment, the CR_PM 114 register has a new control word of 1 or more bits in size that is only configurable by software when the processor is not in VMX mode: Translation Lookaside Buffer Virtual Machine eXtension (TLBVMX). In an alternative embodiment, CR_PM 114 register has two new control words of identical size of 1 or more bits that are only configurable by software when the processor is not in VMX mode: Translation Lookaside Buffer Virtual Machine eXtension (TLBVMX word) and Invalidation Translation Lookaside Buffer Virtual Machine eXtension (TLBVMX invalidation word). In yet another alternative embodiment, CR_PM 114 register has two new control words of identical size of 1 or more bits that are only configurable by software when the processor is not in VMX mode: Translation Lookaside Buffer Virtual Machine eXtension (TLBVMX word) and Translation Lookaside Buffer Virtual Machine eXtension Mask (TLBVMX mask word). In still another alternative embodiment, CR_PM 114 register has one new control word of size of 1 or more bits that is fully configurable by software when the processor is not in VMX mode: Translation Lookaside Buffer Virtual Machine eXtension (TLBVMX word) and the Virtual Machine Control Structure (VMCS) has a new field of identical size, Translation Lookaside Buffer Virtual Machine eXtension Mask (TLBVMX mask field). When the processor is in VMX mode access to the TLBVMX word is controlled by the TLBVMX mask field in the currently active VMCS such that the processor can only access those bits of the TLBVMX word whose corresponding bits are cleared in the TLBVMX mask field in the currently active VMCS. In still another embodiment the TLBVMX mask field is inverted and the condition for access is inverted such that access to bits of the TLBVMX word is only allowed for bits that are set in the TLBVMX mask field in the currently active VMCS.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a virtual machine (VM) module 145 and a virtual machine monitor (VMM) module 148. The VM and VMM 145 and 148 may also be implemented by hardware, software, firmware, microcode, or any combination thereof. The system memory 140 may also include other programs or data which are not shown, such as one or more guest operating systems, as well as sets of page tables $190_1$ to $190_L$. The sets of page tables $190_1$ to $190_L$ may be created and maintained by software and reside in system memory 140 or they may be implemented and maintained by hardware, firmware, microcode, or any combination thereof. There may be one or more sets of page tables for the Virtual Machine Monitor (VMM) and one or more sets of page tables for each of one or more Virtual Machines (VMs).

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface, processor interface, interrupt controller, direct memory access (DMA) controller, power management logic, timer, universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read machine-readable media.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc. that is implemented or embodied in a hardware structure (e.g., flash memory). Examples of firmware may include microcode, writable control store, and micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 2:
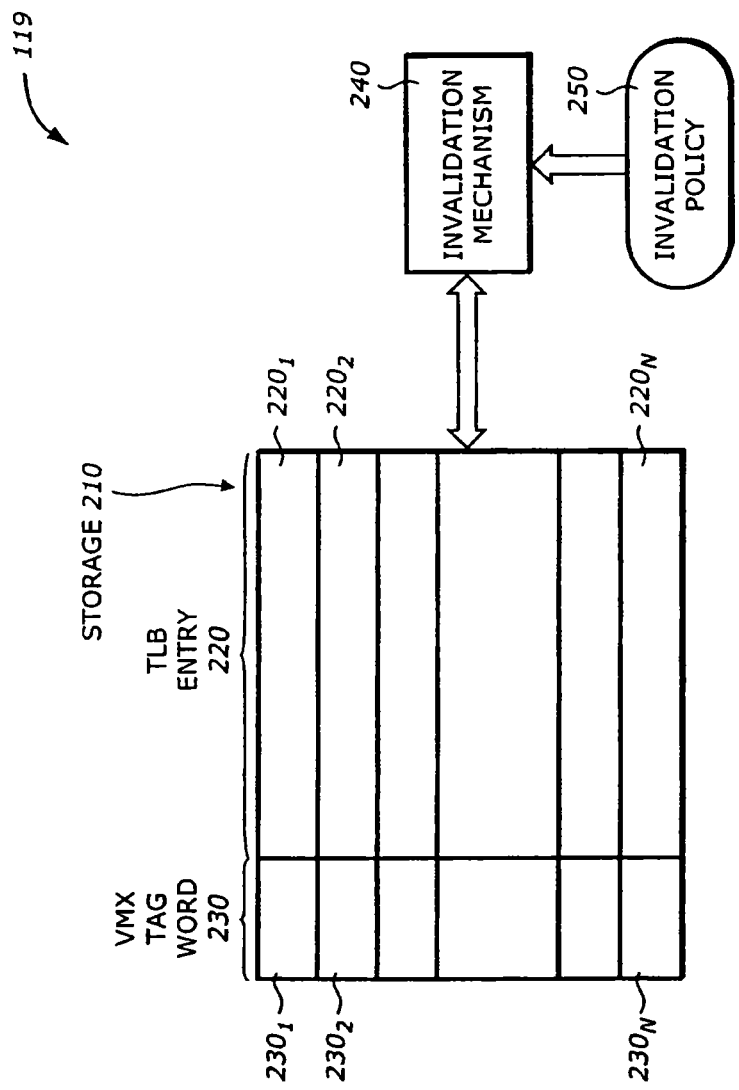
FIG. 2 is a diagram illustrating a translation lookaside buffer (TLB) shown in FIG. 1 according to one embodiment of the invention.

FIG. 2 is a diagram illustrating a translation lookaside buffer (TLB) 119 shown in FIG. 1 according to one embodiment of the invention. The TLB 119 includes a storage 210 and an invalidating mechanism 240.

The storage 210 is a fast memory organized with two fields TLB entry 220 and virtual machine extension (VMX) tag word 230. For some integer N the TLB 220 has N TLB entries $220_1$ to $220_N$ and the VMX tag word array 230 has N VMX tag words $230_1$ to $230_N$. Each of the N TLB entries $220_1$ to $220_N$ has an associated VMX tag word. Each of the N TLB entries $220_1$ to $220_N$ is referred to as a TLB translation or translation for short. Each of the VMX tag words $230_1$ to $230_N$ indicates if the associated TLB entry is invalidated according to a processor mode when an invalidation operation is performed. When a VMX tag word is non-zero, the corresponding TLB entry is referred to as a VMX translation. When a VMX tag word is zero (0), the corresponding TLB entry is referred to as a non-VMX translation.

At any given time, the processor may be in VMX mode. VMX mode is the mode when the processor is executing guest code in a VM. The processor is not in VMX mode when the VMM is executing. In one embodiment, the VMM operates in the protected mode of operation of an Intel Architecture processor. The VMM may create several VMs and each of the VMs operates in VMX mode. The processor mode may be set by a hardware circuit or by a configuration word programmed by software. Each of the VMX tag words $230_1$ to $230_N$ may correspond to a VM created by the VMM. In one embodiment, the VMX tag word field 230 has a word size of one bit.

As noted in the preceding paragraph, in one embodiment, the VMX tag word is a single bit, so it is always 1 when in VMX mode and 0 when not in VMX mode (or vice versa). Note that the active level of logical 1 or 0 is for illustrative purposes. Other active levels may be used. A bit is said to be asserted when it is set to its active level and to be negated when it is set to the complement of its active level. In the Intel Architecture, the value of this bit could be stored in a control register, a model-specific register, a new architectural register, or a new register. In fact, the value of this bit need not be visible at all and the Translation Lookaside Buffer Virtual Machine eXtension (TLBVMX word) need not exist per se since the necessary information can be derived automatically from other processor state (i.e., 1 when in VMX mode, 0 when not, or vice versa). In an alternative embodiment, the VMX tag word is larger than one bit and it is then set to the new value of the TLBVMX control word, which corresponds to the particular VM being executed, as the processor transitions into VMX mode. To maintain proper operation of the processor, the VMM would naturally prevent direct accesses by guest OSes to the TLBVMX control word In another embodiment, the VMX tag word field 230 has a word size of greater than one bit, which we denote by M, and distinct VMX tag word values, excepting the zero (0) value that is reserved for the VMM, are assigned to VMs as they are created by the VMM until the largest possible value is reached, said value being shared by all subsequently created VMs (e.g., if M is 8 then 0 is for the VMM, 1 through 6 are for the first 6 VMs created and 7 is shared by all additional VMs). In another embodiment, the VMX word field 230 again has a word size of greater than one bit and multiple distinct VMX tag word values are reserved for one or more VMMs and the remaining values are assigned to VMs as they are created by the VMMs until the largest possible value is reached, said value being shared by all subsequently created VMs.

Some embodiments of this invention may support a TLB-VMX word 116 in a new or existing control register. The width of this field is the same as the width of the VMX tag words 230 associated with the TLB entries. It determines the number of different address spaces whose translations may be cached in the TLB at any one time. Some embodiments may report the width of this field to software through some mechanism. For example, IA-32 processors report capabilities such as this through the CPUID instruction or through capability registers. Any such mechanism might be used to report the width of the TLBVMX word supported by a CPU.

Some virtual-machine systems may support layers of virtual machine monitors (VMMs). For example, a single VMM ultimately controls the CPU. This "root" VMM may support, in guest VMs, other VMMs ("guest" VMMs) that may themselves support guest VMs. The support for layering may be provided by software, hardware, or a combination of the two. For systems based on embodiments that support the VMX tag words defined in this invention, the multiple VMMs (e.g., root and guest VMMs) may all seek to manage the address spaces of their respective guests using the CPU's TLBVMX word. For embodiments that support a single TLBVMX word, this represents a challenge.

In one embodiment of the invention, the root VMM partitions the bits in the TLBVMX word into those that it controls and those whose control is yielded to its guest VMMs. If the width (in bits) of the CPU's TLBVMX word is M and the root VMM wants to support $2^L-1$ guest VMMs, where L<M, then the root VMM can assign to each of its guest VMMs a unique value in the range 1 to $2^L-1$. Whenever the guest VMM with value I ($1 \leq I \leq 2^L-1$) is running, the root VMM will ensure that the high L bits of the CPU's TLB tag word will contain the value I. These bits will be given the value 0 only for (1) the root VMM or (2) guests of the root VMM that are not themselves VMMs. The root VMM will present to each guest VMM (through a capability reporting mechanism described above) the abstraction of a VM with a virtual CPU in which the width of the TLBVMX word is M-L. The guest VMMs will each be allowed to control only the low M-L bits of the TLBVMX word. Each such guest can thus support up to $2^{M-L}-1$ guests whose address spaces can concurrently use the TLB.

This embodiment requires that the root VMM is able to (a) control the reporting of the width of the TLBVMX word to its guest VMMs, and (b) prevent its guest VMMs from modifying or reading selected bits of the TLBVMX word.

Both of these capabilities are already supported in some virtual-machine systems. For example, in IA-32 systems, it is sufficient to ensure that guest attempts to execute the CPUID instruction or to read capability registers or to read or write control registers cause transitions to the root VM monitor (VMM). The root VMM can then emulate the relevant guest instruction, presenting to its guest the values it desires (e.g., in this case, it would report to its guest that the width of the TLBVMX word is M-L instead of M).

Trapping to the root VMM from a higher level guest VMM so that the root VMM can emulate a single guest instruction is expensive but, since that reporting the width of the TLBVMX word should be an infrequent operation, this manner of support should not adversely affect performance. On the other hand, guest VMMs will be modifying and/or reading bits in the TLBVMX word frequently as they do VM entrances to their guest VMs.

In an alternative embodiment of the invention, the processor provides a TLBVMX mask word to provide bit-by-bit capability to mask and shadow fields for control registers to constrain the ability of guest software to read and modify control registers Thus software in a VM is only allowed to access those bits of the TLBVMX word whose corresponding bits are cleared in the TLBVMX mask word. For example, if the TLBVMX word is 10100000 and the TLBVMX mask word is 11110000 then a read by software of the TLBVMX word might return 0000 and software can set the TLBVMX word to any desired value from 10100000 to 10101111 by simply writing the low order bits, the high order bits are automatically supplied by the logical AND of the TLBVMX mask word and the TLBVMX word.

To efficiently support a layered virtualization architecture, the processor provides a hardware-managed stack of TLBVMX mask words that work as follows. Incident to a VM entrance a VMM can specify a new value of the TLBVMX mask word for the guest (whether VMM or not) but the new value will be automatically logically ORed by the processor with the old value of the TLBVMX mask word so that the logical AND of the new value and the old value of the TLBVMX mask word will be equal to the old value. The old value is automatically restored from the hardware-managed stack upon a VM exit. In the new guest the TLBVMX mask word constrains the space of possible TLBVMX word values. For example, continuing the above example, if the (intermediate) VMM sets the TLBVMX word to 10101100 and specifies that the new TLBVMX mask word will be 1100 then upon VM entrance the TLBVMX mask word is actually set to 11111100 and the TLBVMX word for the guest will be limited to the values 10101100 through 10101111.

In one embodiment of the invention, software specifies the new TLBVMX mask word value for the VM by loading an appropriate field in a Virtual Machine Control Structure In yet another embodiment of the invention, the TLBVMX mask word is replaced by a TLBVMX inverted mask word which functions identically except that it is the logical NOT of the TLBVMX mask word and may thus be logically NOTed in the above formulas. Storing and using such an inverted mask word could simplify an actual implementation depending on the underlying logic circuitry in the processor.

Using these techniques, a guest VMM could reserve K bits in the TLBVMX word (of the M-L bits to which it has access) for its own use, presenting to its guest VMM the abstraction of virtual CPU with a TLBVMX word with only M−(L+K) bits. The technique can be used for at most M layers, after which any guest VMMs would be presented with the abstraction of a virtual CPU that does not support a TLBVMX word.

The invalidation mechanism 240 invalidates the TLB entries according to an invalidation policy 250. The invalidation mechanism 240 may be implemented as a circuit having a control logic consistent with the invalidation policy 250. The control logic provides an efficient way to update or invalidate the TLB entries in a virtual-machine system.

Figure 3:
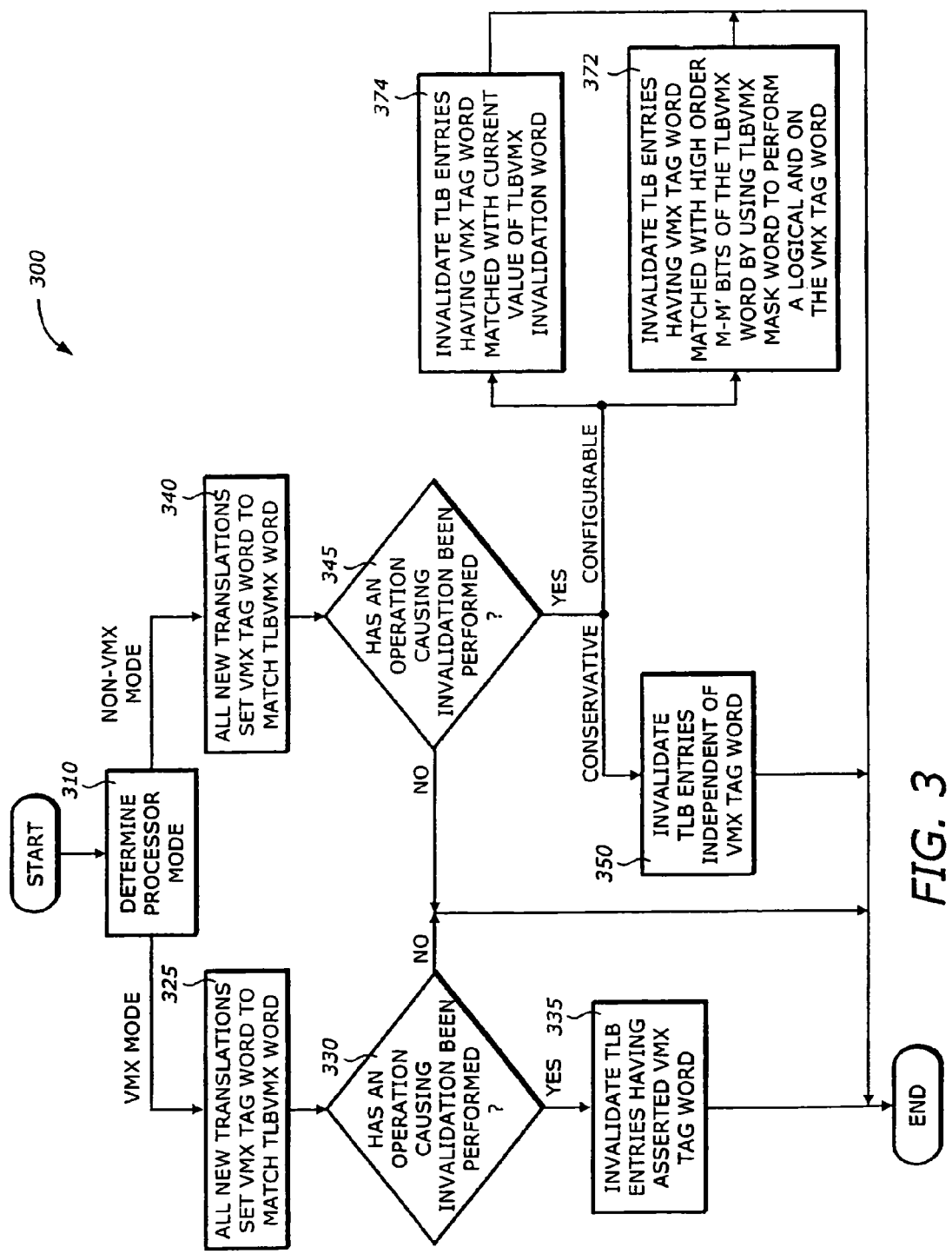
FIG. 3 is a flowchart illustrating an invalidating policy for the TLB entries shown in FIG. 2 according to one embodiment of the invention.

FIG. 3 is a flowchart illustrating a process 300 to implement the invalidation policy 250 for the TLB entries shown in FIG. 2 according to one embodiment of the invention.

Upon START the process 300 determines if the processor is in VMX mode (Block 310). As noted above, in one embodiment of the invention, the VMX tag word is a single bit and the TLBVMX word may exist only logically, its contents being derived automatically from other processor state. In other embodiments, the TLBVMX word may be more than one bit and exists as a physical field in the CR_PM 114 control register. For all embodiments of the invention, if the processor is in VMX mode, then all new translations in the TLB set the VMX tag word to match the possibly logical value of the TLBVMX word (Block 325) and if the processor is not in VMX mode, then all new translations set the VMX tag word to match the possibly logical value of the TLBVMX word (Block 340).

Next, if the processor is in VMX mode, the process 330 determines if an operation causing invalidation of one or more TLB entries is performed (i.e., an invalidation operation) (Block 330). For an Intel Architecture processor, examples of such invalidation operations are INVLPG (invalidates only one entry) and loads to the CR3 register (invalidates all entries). If so, the process 300 invalidates the one or more TLB entries, as appropriate, provided that every TLB entry invalidated must have a VMX tag word value that matches the value in the TLBVMX word (which may exist only logically), otherwise the process 300 is terminated.

Alternatively, if the processor is not in VMX mode, the process 300 determines if an invalidation operation has been performed (Block 345). If so, the process 300 proceeds to invalidate one or more TLB entries, as appropriate to the invalidation operation being performed (e.g., INVLPG on an Intel Architecture processor), providing that the VMX tag word for the entry or entries match according to one of three rules or implementations. The selection of which rule is to be used depends on performance enhancement and implementation risk. In the conservative rule, the process 300 invalidates one or more TLB entries regardless of the VMX tag words (Block 350). In one embodiment of the configurable rule, the process 300 invalidates only those zero or more TLB entries that have the associated VMX tag word matched with the high order M-M' bits of the TLBVMX word (FIG. 1) by using the TLBVMX mask word to perform a logical AND on the VMX tag word (Block 372). In another embodiment of the configurable rule, only those zero or more TLB entries having a VMX tag word set to match the current (possibly logical) value of the TLBVMX invalidation word are invalidated (Block 374). For all rules, if an invalidation operation is not performed, the process 300 is terminated.

Note that, regardless of any rules above defining behavior both inside and outside VMX mode, a change to the CR_PA 112 register incident to a transition into VMX mode (i.e., VM entrance) or out of VMX mode (i.e., VM exit) does not invalidate any entries in the TLB. This special case is therefore not an invalidation operation.

Figure 4:
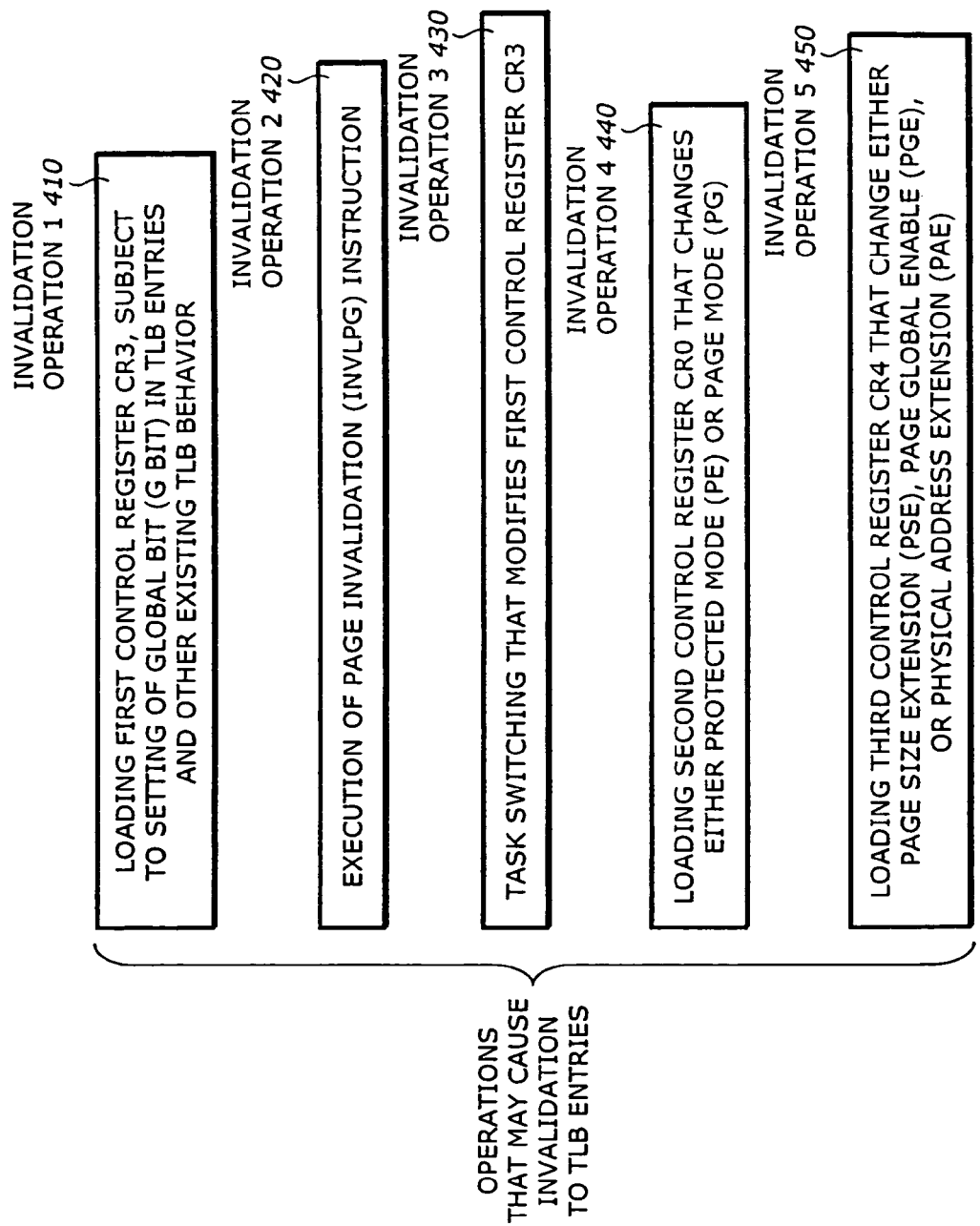
FIG. 4 is a list of operations that cause TLB entry invalidations according to one embodiment of the invention. Such operations are referred to as invalidation operations in the following description.

FIG. 4 is a list of invalidation operations according to one embodiment of the invention. Specifically, for an Intel Architecture processor there are basically five invalidation operations.

Invalidation operation 1 (Block410): Loading the first register CR3, subject to the setting of the global (G) bit in the TLB entry and other existing TLB behavior such as the width of the TLBVMX word.

Invalidation operation 2 (Block420): Execution of the page invalidation instruction (e.g., INVLPG instruction in the Intel Architecture)

Invalidation operation 3 (Block430): Task switching that modifies the first control register CR3.

Invalidation operation 4 (Block440): Loading the second register CR4 that changes either the PE bit or the PG bit.

Invalidation operation 5 (Block450): Loading the third register CR4 that changes one or more of the PSE bit, PGE bit, or PAE bit.

By providing the VMX tag word associated with each TLB entry in the TLB, a VM system can efficiently trap to the VMM and resume execution of the VM without invalidating the TLB. This significantly increases the efficiency of the VMM system.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising: a hardware managed stack to hold a plurality of virtual machine extension (VMX) mask word values corresponding to a plurality of virtual machines (VMs), wherein a current VMX mask word value of the plurality of VMX mask word values, which corresponds to a current VM of the plurality of VMs, is to be utilized to mask access by the current VM to a VMX control word; and a translation lookaside buffer (TLB) having a plurality of TLB entries, wherein a TLB entry of the plurality of TLB entries is to be associated with a virtual machine extension (VMX) tag word, and invalidation logic to determine the TLB entry is to be invalidated responsive to a comparison of the VMX tag word and the VMX control word indicating the TLB entry is to be invalidated in response to an invalidation operation being performed.

2. The apparatus of claim 1 wherein the invalidation operation is selected from a group consisting of (1) a load of a first control register conditioned on a global bit, (2) an execution of a page invalidate instruction, (3) task switch involving change of at least one virtual memory related control register, (4) a load of a second control register that modifies one of a protected mode indicator and a page mode indicator, and (5) a loading of a third control register that modifies one of page size extension (PSE), a page global enable (PGE), and a physical address extension (PAE).

3. The apparatus of claim 1 further comprising a first register to hold the VMX control word and a second register to hold the current VMX mask word value.

4. The apparatus of claim 1 further comprising a memory to hold a virtual machine control structure (VMCS), wherein the VMX control word is to be held in the VMCS.

5. The apparatus of claim 1 wherein the invalidation logic to determine the TLB entry is to be invalidated responsive to a comparison of the VMX tag word and the VMX control word indicating the TLB entry is to be invalidated in response to an invalidation operation being performed comprises: determining the TLB entry is to be invalidated in response to the invalidation operation being performed and the VMX tag word matching the VMX control word.

6. The apparatus of claim 1 wherein the VMX control word is configurable a non-virtual machine execution mode.

7. The apparatus of claim 1 further comprising a second VMX control word, wherein the invalidation logic is to determine the TLB entry is to be invalidated responsive to a logical AND of the VMX tag word and the second VMX control word matches the VMX control word.

8. The apparatus of claim 7 wherein a logical AND of the current VMX mask word and a previous VMX mask word matches the previous VMX mask word.

9. The apparatus of claim 1 wherein the VMX tag word and the VMX control word are determined by execution of a specified processor instruction in a specified manner.

10. The apparatus of claim 1 wherein a size of a VMX tag word and the VMX control word is determined by executing a specified processor instruction in a specified manner.

11. The apparatus of claim 10 wherein the specified instruction is a central processor unit identification (CPUID) instruction and the specified manner is to have a specified value in a control when the CPUID instruction is executed.

12. A processor comprising:
a virtual machine extension (VMX) mask word to mask access to VMX control (TLBVMX) word during a VMX mode of operation;
a translation lookaside buffer (TLB) having a plurality of TLB entries, each TLB entry being associated with a virtual machine extension (VMX) tag word; and
invalidation logic, in response to an invalidation operation during the VMX mode of operation, to invalidate each TLB entry being associated with a VMX tag word that matches the TLBVMX word.

13. The processor of claim 12 wherein the invalidation operation is selected from a group consisting of (1) a loading of the first control register conditioned on a global bit, (2) an execution of a page invalidate instruction, (3) a task switch involving change of at least one virtual memory related control register, and (4) a loading of the third control register that modifies one of a page size extension (PSE), a page global enable (PGE), and a physical address extension (PAE).

14. The processor of claim 12 wherein invalidation logic, in response to an invalidation operation during the virtual machine mode of operation, to invalidate each TLB entry being associated with a VMX tag word that matches the TLBVMX word comprises: the invalidation logic, in response to an invalidation operation during the virtual machine mode of operation, to updated each VMX tag word that matches the TLBVMX word to an invalid value to indicate each TLB entry being associated with each VMX tag word that matches the TLBVMX word is invalid.

15. The processor of claim 12 further comprising a hardware management stack to hold a plurality of mask values for the VMX mask word, wherein each of the plurality of mask values correspond to a layered virtual machine.

16. The processor of claim 12 wherein the invalidation logic, in response to an invalidation operation during a non-VMX mode of operation, to invalidate a TLB entry of the plurality of TLB entries irrespective of the VMX tag word being associated with the TLB entry.

17. An apparatus comprising:
execution resources to execute a first virtual machine (VM) during a virtual machine extensions (VMX) mode of execution;
a control field to hold a current VM value, the current VM value to include a first VM value during execution of the first VM;
a mask field to provide masked access for at least the first VM to the control field; and
a translation lookaside buffer (TLB) including a plurality of TLB entries, wherein a first TLB entry of the plurality of TLB entries is to be associated with a first virtual machine extension (VMX) tag field and a second TLB entry of the plurality of TLB entries is to be associated with a second VMX tag field, the first VMX tag field to hold a first value to indicate the first TLB entry is associated with the first VM and the second VMX tag field to hold a second value to indicate the second TLB entry is associated with a second VM, and wherein, in response to an invalidation operation, the first TLB entry is determined to be invalidated based on the first value held in the first VMX tag field and the current value held in the control field.

18. The apparatus of claim 17, wherein the execution resources are also to execute a virtual machine monitor (VMM) during non-VMX mode of execution.

19. The apparatus of claim 18, further comprising a hardware-managed stack, wherein in response to an entrance into the first VM, the VMM is to provide a Previously Added mask value to be held in the mask field and an old value held in the mask field is to be pushed on the hardware-managed stack.

20. The apparatus of claim 19, wherein the Previously Added mask value is logically ORed with the old mask value before the Previously Added mask value is held in the mask field.

21. The apparatus of claim 20, wherein the old mask value is popped off the hardware-managed stack and restored the mask field in response to exiting the first VM.

22. The apparatus of claim 18, wherein a system memory is coupled to the apparatus, the system memory to hold a virtual machine control structure (VMCS), the VMCS to hold a state of the VMM.

23. The apparatus of claim 22, wherein the VMCS is also to hold the control field and the mask field.

24. The apparatus of claim 18, wherein the control field and the mask field are included in control registers.

25. The apparatus of claim 17, wherein the invalidation operation is selected from a group consisting of a load a control register operation, an invalidate a page operation, and a task switch operation.

26. The apparatus of claim 17, wherein in response to an invalidation operation, the first TLB entry is determined to be invalidated based on the first value held in the first VMX tag field and the current value held in the control field comprises determining the first TLB entry is to be invalided in response to the first VMX tag field and the current value being the same.

* * * * *